Dec. 18, 1956     F. R. BAUER     2,774,209
STRAW BUNCHING ATTACHMENT FOR COMBINES
Filed June 30, 1951
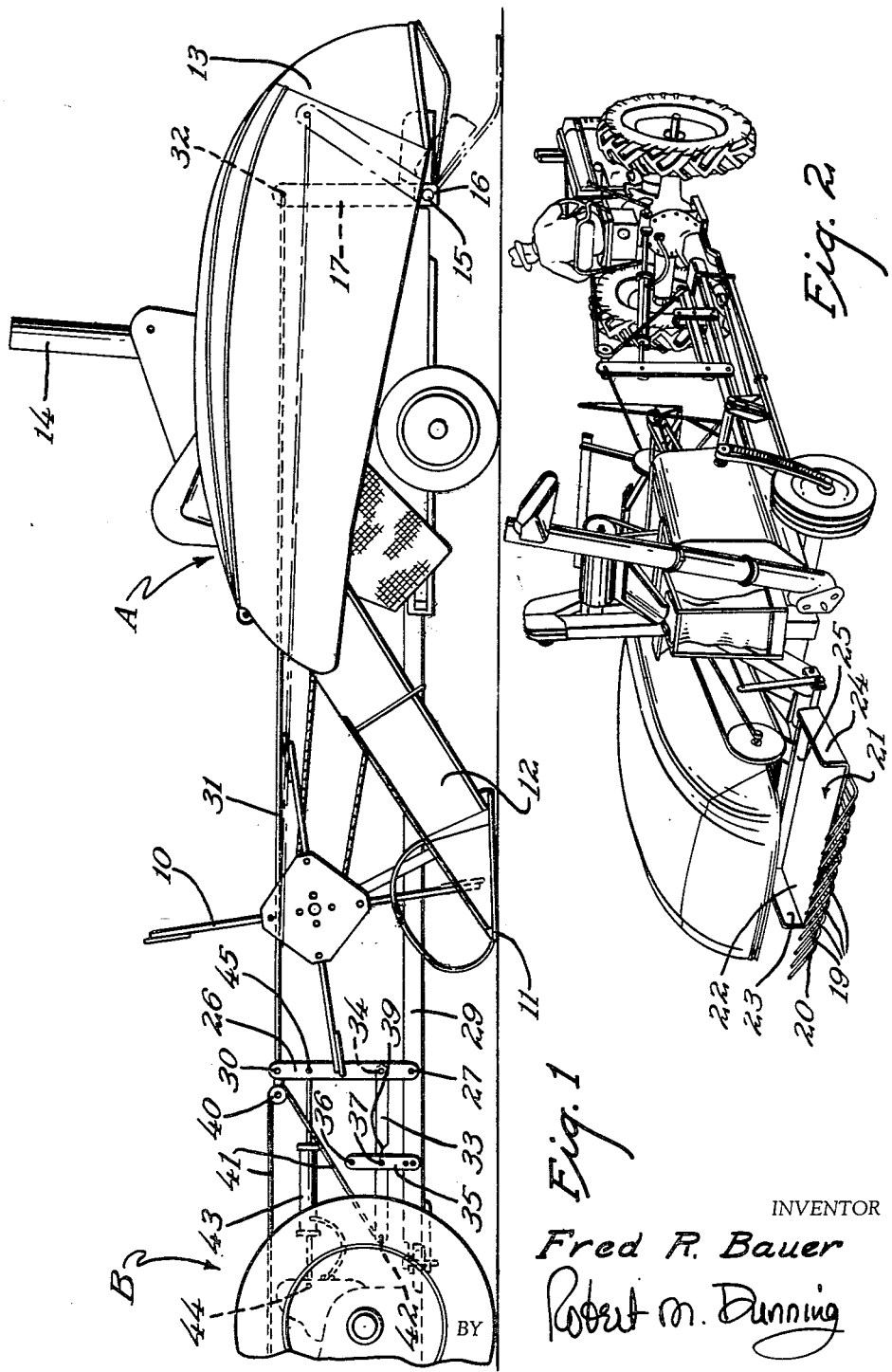
INVENTOR
Fred R. Bauer
BY Robert M. Dunning
ATTORNEY United States Patent Office 2,774,209
Patented Dec. 18, 1956

2,774,209

STRAW BUNCHING ATTACHMENT FOR COMBINES

Fred R. Bauer, Durand, Wis., assignor of forty-nine percent to Norbert Benedict Bauer and Anna Mae Bauer, Durand, Wis.

Application June 30, 1951, Serial No. 234,529

8 Claims. (Cl. 56—122)

This invention relates to an improvement in combine attachment and deals particularly with a device for collecting the chaff and straw passing through the combine and depositing this material in piles upon the ground.

In using a combine it is usual practice to separate the grain from the remaining portions of the plant and to drop the chaff and straw onto the ground rearwardly of the combine. This straw may later be raked up for use. The straw is usually raked into windrows and later picked up by suitable means. The present invention is designed to eliminate the necessity of raking the straw into windrows as the combine itself is capable of accomplishing this result.

An object of the present invention lies in the provision of a means of collecting both the chaff and the straw and depositing this material in such a way that the chaff tends to fall upon the straw. In this way much of the chaff and small pieces of the plant may be saved. Previously most of this fine material has been lost, as it is virtually impossible to collect it once it is dropped upon the ground.

A feature of the present invention lies in the provision of a straw and chaff collecting member which is pivotally supported beneath the straw and chaff outlet of the combine. This collecting means is held in collecting position by a suitable latch mechanism. When it is desired to dump the straw and chaff this may be done by releasing the latch which permits the collecting mechanism to pivot downwardly so that the material collected thereupon may slide onto the ground. The chaff tends to slide onto the straw during this action, thus resulting in a saving of a material portion thereof.

A feature of the present invention lies in the apparatus for holding the collecting device in elevated position and in releasing the same when desired. A lever arm is supported upon the collector to pivot in unison therewith. A second lever is pivotally supported upon the combine draw bar in parallel relation to the first lever. A cable or other flexible connector may connect the two levers. A latch arm is pivoted to the forward lever and includes a notch engageable with a suitable catch to hold the lever in proper position to hold the collector elevated. By raising the latch lever the notch therein is disengaged from the catch, permitting the levers to pivot simultaneously in a direction to lower the collector.

A feature of the present invention lies in the provision of a means of elevating the collecter after the straw and chaff have been dumped. This includes a hoisting cylinder connected to the front lever and to the tractor or draw bar. Thus the collector may be elevated hydraulically by power delivered by the tractor. This hydraulic cylinder may serve as a check or dashpot in cushioning the lowering operation.

These and other objects and novel features of the present invention will be more clearly and fully set forth in the following specification and claims.

In the drawings forming a part of the specification:

Figure 1 is a side view illustrating a combine, a combine draw bar, and a tractor showing the mechanism attached thereto.

Figure 2 is a perspective view of the collecting apparatus detached from the combine.

With reference to the drawings, the combine is indicated in general by the letter A, while the rear portion of a tractor B is indicated towing the combine. The combine may be of any desired type and is shown as including a reel 10 which directs the grain against the cutter bar at 11. The cutter bar 11 delivers the cut grain onto a conveyor within the conveyor enclosure 12 which gently elevates the grain to the feeder which is located at the upper end of the conveyor. The grain passes by a wide rasp bar cylinder which separates the grain from the straw and the chaff and grain are separated by suitable screens. The straw is conveyed from the cylinder to the rear portion 13 of the combine where it is permitted to drop onto the ground. The grain and chaff are separated by screening and the grain is elevated through suitable discharge spouts such as 14. The chaff is conveyed to the rear 13 of the combine where it also is permitted to drop onto the ground.

In order to support the straw and chaff, I provide a transverse shaft 15 supported to the body of the combine forwardly of the straw and chaff outlet. This shaft is supported by suitable bearings such as 16 and is provided with a lever arm 17 thereupon which rotates in unison with the shaft 15. The shaft 15 serves as a pivotal anchoring point for one end of the spaced tines 19, in the manner as herein disclosed. As best illustrated in Figure 2 of the drawings the collector or collecting apparatus includes a series of spaced tines 19 which are bent intermediate their ends as indicated at 20. The tines are held in spaced relationship by suitable cross braces or any other suitable means. A chaff tray 21 rests upon the tines 19 near the pivoted ends thereof. This tray 21 includes an imperforate bottom portion 22, side walls 23 and 24 and an end wall 25. The chaff is dropped upon this tray and retained thereupon during the collecting operation.

Figure 1 of the drawings diagrammatically illustrates the collecting mechanism in both elevated and lowered positions. In elevated position the portions of the tines over which the chaff tray 21 extends are substantially horizontal while the free ends of the tines incline upwardly to some extent. The straw is collected upon the tines and upon the outer portion of the tray 21 while the chaff rests upon the tray. In lowered position of the collecting apparatus shown in broken lines in Figure 1, the free ends of the tines are substantially parallel with the ground while the hinged ends thereof incline at a substantial angle. This causes the chaff to tend to slide onto the straw so that a substantial portion of the chaff may be saved. The stubble of the field tends to extend between the tines and to move the straw from the tines upon movement of the combine.

In order to support the collector in elevated position, a lever 26 is hingedly connected at 27 to the combine draw bar 29. The upper end of this lever 26 is connected at 30 to a flexible cable 31 or other suitable connecting means which connects the upper end of the lever 26 to a point 32 of the upper end of the arm 17. The levers 26 and 17 are preferably substantially parallel at all times.

In order to hold the collector elevated, I provide a latch arm 33 which is pivotally connected at 34 to the lever 26. A pair of arms 35 are bolted or otherwise affixed to the draw bar 29 to extend upwardly therefrom. A pair of spaced bolts 36 and 37 extend between the arms 35 to hold the same in spaced relation. A notch 39 in the lower surface of the latch arm 33 is engageable with the lower one of these bolts or fastening means 37 and therefore this bolt acts as a catch to combine with the latch to hold the lever arms 26 from pivoting in a clockwise direction as viewed in Figure 1.

A pulley 40 is supported near the upper end of the lever 26 and a cord or cable 41 is anchored at 42 to the forward end of the latch arm 33. This cable 41 extends over the pulley 40 and extends forwardly, the forward end being attached to a fixed object on the tractor B. By pulling forwardly on the cable 41 the forward end of the latch arm 33 may be raised, disengaging the notch 39 from the catch 37. As soon as the notch is disengaged the weight of the collector swings the levers 26 and 17 in a clockwise direction as viewed in Figure 1 until the collector swings down into open position.

A hydraulic cylinder 43 is connected at one end 44 to a fixed point on the tractor or draw bar and the other end is hingedly connected at 45 to the lever 26. By operation of this hydraulic cylinder the lever 26 may be pivoted in a counterclockwise direction to act through the cable 31 to pivot the lever arm 17 and therefore to swing the collector into upper or closed position.

The fluid supply for the hydraulic cylinder is received from the tractor, many of which are provided with hydraulic pumps and hydraulic cylinders which may be used for various purposes. The hydraulic cylinder in the present instance may be used as a dashpot to cushion the lowering action of the collector.

In accordance with the patent statutes, I have described the principles of construction and operation of combine attachment and while I have endeavored to set forth the best embodiment thereof, I desire to have it understood that obvious changes may be made within the scope of the following claims without departing from the spirit of my invention.

I claim:

1. A waste collector attachment for a combine having a draw bar, a chaff and straw outlet, and a transverse shaft supported by the body of the combine forwardly of the shaft and straw outlet the attachment including in combination a chaff and straw collector having a plurality of aligned tines for collecting and dumping said chaff and straw in windrows pivotally supported by said transverse shaft beneath the straw outlet, said collector being pivotal between an elevated collecting position and an inclined dumping position a lever arm connecting to the collector for pivotal motion in unison therewith, a second lever pivotally supported upon the combine draw bar, means connecting said levers at points spaced from the pivot points thereof so that said levers move in unison, and latch means connected to said second lever for holding said levers in position to hold said collector elevated.

2. The structure described in claim 1 and in which the means connecting the levers comprises a flexible member.

3. The structure described in claim 1 in which the levers are in parallel relationship.

4. The structure described in claim 1 and including means extending forwardly from said second lever for disconnecting said latch means.

5. The structure described in claim 1 and including hydraulic means for elevating said collector.

6. A waste collector attachment for use with a combine having a straw and chaff outlet, transverse attachment supporting means forwardly of the straw and chaff outlet, a draw bar, the attachment including in combination a collector having a plurality of aligned tines for collecting and dumping said chaff and straw in windrows, said transverse supporting means pivotally supporting said collector beneath said straw and chaff outlet, said collector being pivotal from an elevated collecting position to an inclined dumping position, a lever arm connected to said collector for pivotal movement in connection therewith, a second lever pivotally connected to the combine draw bar, means connecting said levers to move the same in unison, a latch arm pivotally connected to said second lever to extend forwardly therefrom and having a notch therein at a point spaced from the pivotal connection, a catch engageable with said notch to hold said levers in position to hold said collector in elevated position, and means for pivoting said latch arm to disengage said notch from said catch.

7. The structure described in claim 6 and in which the collector comprising said plurality of spaced tines includes an imperforate tray overlying said tines adjacent the hinged ends thereof.

8. The structure described in claim 6 and in which said tines are bent intermediate the ends thereof, shaft means connected to one end of each tine and pivotally supporting the same, said tines in one position having their free ends substantially parallel to the ground, and an imperforate tray overlying the ends of the tines connected to said shaft means pivotally supporting the tines.

References Cited in the file of this patent

UNITED STATES PATENTS

| 333,533 | Matteson | Jan. 5, 1886 |
| 384,862 | Miller | June 19, 1888 |
| 418,091 | Thompson | Dec. 24, 1889 |
| 1,027,484 | Kejr | May 28, 1912 |
| 2,072,997 | Wittstruck | Mar. 9, 1937 |
| 2,363,986 | Mott | Nov. 28, 1944 |
| 2,397,375 | Scranton | Mar. 26, 1946 |

FOREIGN PATENTS

| 15,457 | Australia | July 24, 1929 |